(No Model.)
I. OLSEN.
FARM GATE.
No. 395,579. Patented Jan. 1, 1889.
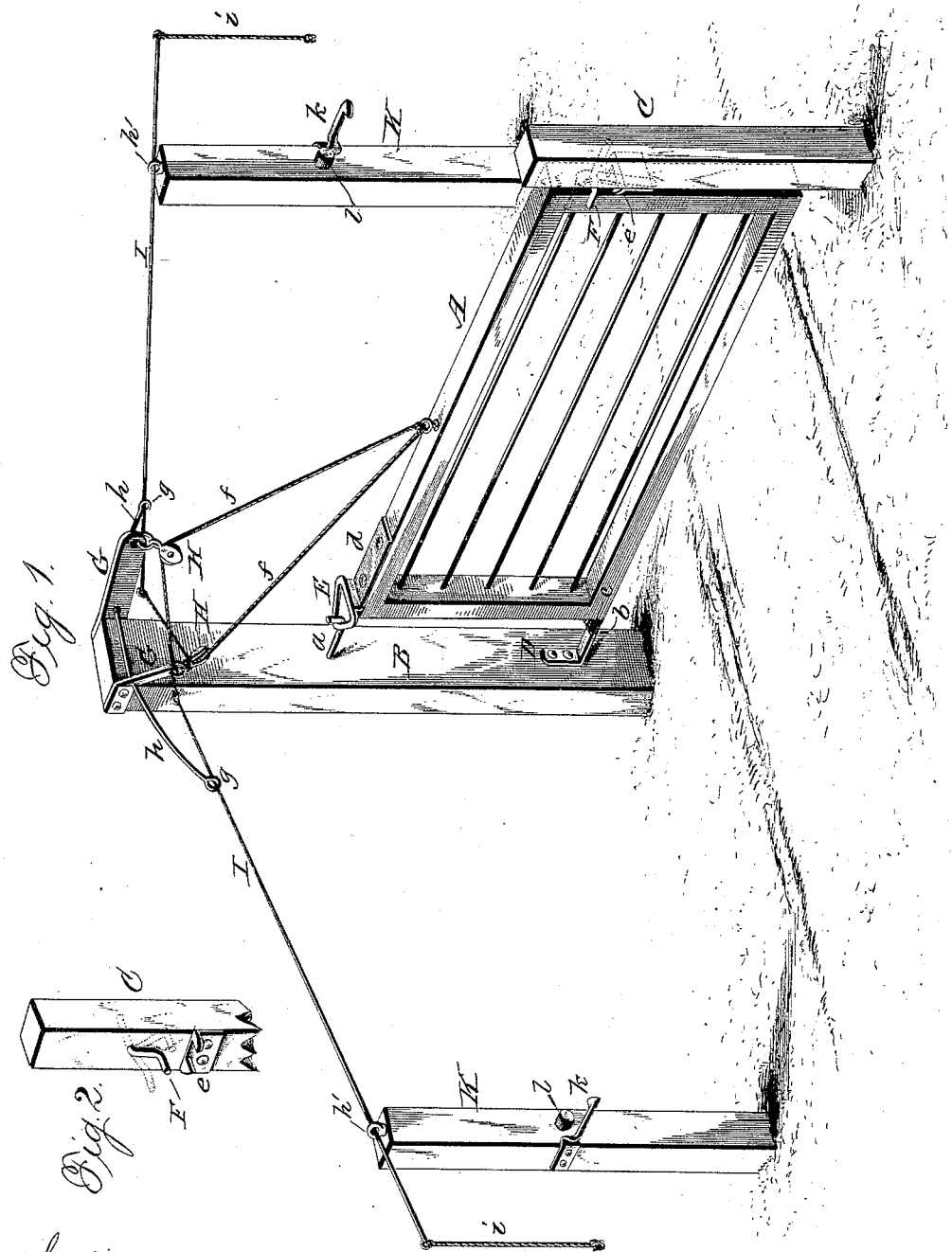

UNITED STATES PATENT OFFICE.

ISAK OLSEN, OF MANITOWOC, WISCONSIN.

FARM-GATE.

SPECIFICATION forming part of Letters Patent No. 395,579, dated January 1, 1889.

Application filed September 24, 1888. Serial No. 286,287. (No model.)

*To all whom it may concern:*

Be it known that I, ISAK OLSEN, a citizen of the United States, residing at Manitowoc, in the county of Manitowoc and State of Wisconsin, have invented certain new and useful Improvements in Farm-Gates; and I do hereby declare that the following is a full, clear, and exact description of the same, reference being had to the annexed drawings, making a part of this specification, and to the letters and figures of reference marked thereon.

Figure 1 of the drawings is a perspective view of my improved farm-gate, and Fig. 2 a detail view, in perspective, of a portion of the outer gate-post, showing the keeper for the gate-latch and pivoted crank-stop.

The present invention has relation to that class of farm-gates adapted to be operated by equestrians or persons in vehicles by means of rope and pulleys connected with the gate upon each side thereof, and the object thereof is to provide a simple and effective means for opening and closing the gate and retaining it closed, which objects I attain by the construction substantially as shown in the drawings, and hereinafter described and claimed.

In the accompanying drawings, A represents the gate, and B C the two gate-posts, to the former the gate being hinged in the following manner: To the inner side of the post B, the required distance from the base thereof, is secured the hook *a*, and below this a bracket, D, is suitably connected to the post, said bracket having a bifurcated end, *b*, and between said bifurcation is located a plate, *c*, connected to the under side of the gate and secured to the bifurcated bracket by means of a pin or other similar device, thereby forming a strong and durable hinge-connection between the post and gate, the bifurcation of the bracket giving additional security against the bending of the same by the constant swinging of the gate thereon. To the upper side of the gate is secured a plate, *d*, formed with a triangular eye, E, with which the hook *a* engages, the three inner sides of the eye forming guides for the hook when the gate is swung upon its hinged connection, the peculiar form of the eye providing a very simple and practical device for the purpose.

The outer end of the gate A is provided with a spring-latch, as shown in dotted lines, which latch may be of any well-known form, said latch engaging with a keeper, *e*, secured to the post C, as shown more clearly in Fig. 2.

To provide additional security against the gate swinging beyond the keeper in closing, I employ a very simple and practical device consisting of a pivoted crank-stop, F, connected to the post above the keeper, which acts automatically in forming a stop for the gate when the gate strikes it, it being forced to the position shown in dotted lines, Fig. 2, upon either side of the gate.

To the upper end of the gate-post B are secured hangers G, from which depend suitable pulleys, H, over which pass ropes *f*, attached at one end to the gate and the opposite ends connected to rods I, after crossing each other, as shown. These rods pass through eyes *g* upon the ends of rods *h*, which project from the sides of the hangers G, said eyes forming guides for the rods I, as do also the eyes *h'* upon the ends of the posts K, through which the rods I pass, said rods at their outer ends having ropes *i* depending therefrom, which are of sufficient length to be in convenient reach of the equestrian or person in a vehicle, whereby the gate may be operated from either side.

The posts K are located upon each side of the gate the required distance therefrom, and are each provided with a keeper, *k*, and a buffer, *l*, against which the gate strikes when swung back in opening said gate, thereby taking off any sudden jar upon the gate which would tend to injure the hinge-connection with the post B. By pulling down on one of the ropes or cords *i* the gate will be raised at its outer end sufficiently to disengage it from the keeper *e*, the pivoted crank-stop F dropping to its normal position, as shown in full lines, Fig. 2. After the gate is thus released it will swing back by its own gravity against the post K, upon the side of the gate opposite to that at which the person is who operates it. After passing through, the gate is closed by pulling on the rope or cord upon the opposite side, which will in like manner raise the gate to disengage it from the latch upon the post K, after which it will swing closed by its own gravity and be held closed by the keeper and pivoted crank-stop on the post C.

Having now fully described my invention, what I claim as new, and desire to secure by Letters Patent, is—

The combination, with the hinged gate A and pivoted crank-stop F, of the mechanism for operating the gate, consisting of the hangers G, having pulleys H, the rods $h$, extending out from said arms and provided with eyes $g$, and the cords or ropes $f$, connected to the gate, passing over the pulleys in opposite directions and connected to the ends of rods I, said rods passing through the eyes of the rods $h$, which form guides therefor, substantially as and for the purpose set forth.

In testimony that I claim the above I have hereunto subscribed my name in the presence of two witnesses.

ISAK OLSEN.

Witnesses:
PEARL J. PIERCE,
P. J. PIERCE.